US012529879B2

(12) United States Patent
Chen et al.

(10) Patent No.: US 12,529,879 B2
(45) Date of Patent: Jan. 20, 2026

(54) EXTERNAL MOVABLE STAGE SYSTEM FOR AUTOMATED CELL MICROSCOPIC IMAGING AND ANALYSIS

(71) Applicant: METATECH (AP) INC., New Taipei (TW)

(72) Inventors: Tsung-Chi Chen, New Taipei (TW); Ying-Chen Yang, Taipei (TW); Tzu-Lung Sun, New Taipei (TW)

(73) Assignee: METATECH (AP) INC., New Taipei (TW)

( * ) Notice: Subject to any disclaimer, the term of this patent is extended or adjusted under 35 U.S.C. 154(b) by 0 days.

(21) Appl. No.: 18/951,736

(22) Filed: Nov. 19, 2024

(65) Prior Publication Data
US 2025/0164773 A1    May 22, 2025

Related U.S. Application Data

(60) Provisional application No. 63/601,235, filed on Nov. 21, 2023.

(51) Int. Cl.
*G02B 21/26* (2006.01)
*G01N 35/04* (2006.01)
(Continued)

(52) U.S. Cl.
CPC ............. *G02B 21/26* (2013.01); *G01N 35/04* (2013.01); *G02B 21/367* (2013.01);
(Continued)

(58) Field of Classification Search
CPC ...... G02B 21/26; G02B 21/367; G01N 35/04; G01N 2035/0429; G06T 7/0012;
(Continued)

(56) References Cited

U.S. PATENT DOCUMENTS

| 4,702,565 A * | 10/1987 | Schilling ................ G02B 21/26 108/143 |
| 6,711,283 B1 * | 3/2004 | Soenksen ............. H04N 23/631 382/128 |
| 2002/0090127 A1 | 7/2002 | Wetzel et al. |

OTHER PUBLICATIONS

Taiwan Intellectual Property Office OA dated on Aug. 27, 2025.

* cited by examiner

*Primary Examiner* — Sath V Perungavoor
*Assistant Examiner* — Tyler B Edwards
(74) *Attorney, Agent, or Firm* — WPAT, PC

(57) ABSTRACT

An external movable stage system for automated cell microscopic imaging and analysis comprises a microscope and an external movable stage device. The external movable stage device is attached to the microscope and configured to assist the microscope in observing a cell sample and to avoid vibration of the microscope. The external movable stage device comprises an automatic stage module, a control module and an image positioning module. The automatic stage module comprises a stage adjustment structure and a movable stage connected to the stage adjustment structure. The control module is configured to move the movable stage in scanning manner so that all parts of the sample plate pass through the objective lens of the microscope to obtain sub-images. The image positioning module is configured to automatically adjust the focal length of the microscope lens, and when the displacement of the sub-images is detected, the sub-images is automatically adjusted to the correct position, and the sub-images is synthesized to produce a full image by an image processing method.

16 Claims, 6 Drawing Sheets

(51) Int. Cl.
    *G02B 21/36*     (2006.01)
    *G06T 7/00*      (2017.01)
    *G06T 7/70*      (2017.01)
    *G06V 10/10*     (2022.01)
    *G06V 10/82*     (2022.01)
    *G06V 20/69*     (2022.01)
    *G06V 40/10*     (2022.01)
    *G06V 40/20*     (2022.01)
    *G08B 3/10*      (2006.01)
    *G16H 30/20*     (2018.01)

(52) U.S. Cl.
    CPC .............. *G06T 7/0012* (2013.01); *G06T 7/70* (2017.01); *G06V 10/16* (2022.01); *G06V 10/82* (2022.01); *G06V 20/693* (2022.01); *G06V 20/695* (2022.01); *G06V 40/10* (2022.01); *G06V 40/28* (2022.01); *G08B 3/10* (2013.01); *G16H 30/20* (2018.01); *G01N 2035/0429* (2013.01); *G06T 2207/20081* (2013.01); *G06T 2207/20084* (2013.01); *G06T 2207/30008* (2013.01); *G06T 2207/30196* (2013.01)

(58) Field of Classification Search
    CPC ............. G06T 7/70; G06T 2207/20081; G06T 2207/20084; G06T 2207/30008; G06T 2207/30196; G06V 10/16; G06V 10/82; G06V 20/693; G06V 20/695; G06V 40/10; G06V 40/28; G06V 2201/033; G06V 10/764; G08B 3/10; G16H 30/20
    See application file for complete search history.

EXTERNAL MOVABLE STAGE SYSTEM FOR AUTOMATED CELL MICROSCOPIC IMAGING AND ANALYSIS

BACKGROUND OF THE INVENTION

1. Field of the Invention

The present invention relates to a cell microscopic imaging and analysis system and, more specifically, to an external movable stage system for automated cell microscopic imaging and analysis.

2. Description of the Prior Art

During cell culture, it is often necessary to manually and periodically remove cell culture dishes from the incubator for microscopic observation to assess cell growth, determine harvest timing, and evaluate the quality of the cell culture batch. Quality assessment during cell culture primarily involves observing cell morphology, testing cell viability, analyzing cell proliferation, and detecting cell contamination. Observing cell morphology through a microscope is one of the most common, direct, and efficient methods for evaluating cell culture quality. By examining the shape and size of cells, the extent of cell adhesion to the bottom of the culture dish, and the cell growth density (confluency) within the dish, the quality of the culture and the anticipated harvest time can be assessed.

Conventionally, the evaluation of confluency is typically conducted by a laboratory operator who places a cell culture dish on the specimen stage of the microscope, observing the distribution and growth density of cells within the dish under the microscope using the eyepiece and relying on visual inspection. Concurrently, the operator must manually move the cell culture dish on the stage and adjust the position of the dish in the XYZ axes within the microscope device using adjustment knobs to thoroughly examine the growth state of the cells within the dish. The operator then analyzes the confluency based on their operational experience. However, the use of a microscope for observing cell confluency during the culture process may present the following drawbacks:

1. Frequent movement or handling of the cell culture dish by the operator during observation may increase the risk of contamination within the dish.
2. Prolonged manual observation may cause temperature changes in the cells within the dish due to body heat or environmental temperature fluctuations.
3. Manual repositioning of the dish for observation, lacking precise positioning, may result in blind spots in observation or imaging, thereby preventing comprehensive examination and analysis of the cells.

Some automated stage-moving microscope observation systems are available on the market to address the issue of cell contamination caused by manual handling of the culture dish. In most cases, the automatic stage-moving function is directly integrated into the microscope assembly, creating a microscope observation system with automated stage-moving capabilities. However, these types of systems generally have the following drawbacks:

1. They cannot be independently installed on standard commercial microscopes, requiring each microscope device to be redesigned, significantly increasing manufacturing costs.
2. Since the automatic stage-moving function is built directly into the microscope assembly, it alters the original microscope design, preventing the simultaneous use of manual and automatic stage-moving functions.
3. The motor within the automatic stage-moving device can cause vibrations during operation, potentially leading to misalignment, focusing errors, or displacement of the cell culture dish, which can impact imaging accuracy.

The abovementioned issues can impact the operator's ability to observe cells and effectively perform confluency analysis. Furthermore, current microscope observation systems with automated stage-moving functions only facilitate the movement of the cell culture dish and cannot identify and analyze cell confluency and growth density. As a result, confluency analysis still relies on the operator's visual inspection through the microscope and their personal experience. Therefore, there is a need to develop a new automated stage-moving and cell microscopic imaging and analysis system to address these conventional issues.

SUMMARY OF THE INVENTION

In view of this, one scope of the present invention is to provide an external movable stage system for automated cell microscopic imaging and analysis, configured to assist a microscope in observing a cell sample and prevent vibration of the microscope, the external movable stage system for automated cell microscopic imaging and analysis comprising: an automatic stage module, comprising a stage adjustment structure and a movable stage connected to the stage adjustment structure, wherein the stage adjustment structure is detachably positioned on one side of the microscope, and the movable stage is located between an objective lens of the microscope and a sample stage when the stage adjustment structure is positioned on one side of the microscope, and is driven by the stage adjustment structure to move in the X-axis and Y-axis directions; a control module, coupled to the stage adjustment structure to control the stage adjustment structure to drive the movable stage for movement, the control module being configured to control the movable stage to move in a scanning manner so that all parts of a sample plate sequentially pass through the objective lens of the microscope to capture a plurality of sub-images; and an image positioning module, coupled to the control module, the image positioning module being configured to automatically adjust a focal length of a microscope lens of the microscope, and upon detecting a displacement of the sub-images, automatically adjust the sub-images to a correct position, and synthesize the sub-images by an image processing method to generate a full image.

Wherein, the external movable stage system for automated cell microscopic imaging and analysis comprises an image recognition module coupled to the control module and the microscope, the image recognition module utilizes artificial intelligence to process and analyze the full image, providing precise data on cell growth density and coverage ratio. This reduces subjective errors caused by varying judgments among different operators.

Wherein, the movable stage further comprises an XY-axis stage, configured to horizontally move the sample plate between the objective lens and the sample stage of the microscope along an X-axis and a Y-axis under the driving of the stage adjustment structure.

Wherein, the external movable stage system for automated cell microscopic imaging and analysis further comprises a storage space configured to accommodate the stage adjustment structure and the movable stage of the automatic stage module.

Wherein, the external movable stage system for automated cell microscopic imaging and analysis further comprises a hole and a sealing cover corresponding to the hole, wherein the hole is configured to allow entry and exit of the stage adjustment structure and the movable stage of the automatic stage module, and the sealing cover is configured to prevent contamination of the stage adjustment structure and the movable stage by impurities in an operating environment.

Wherein, the movable stage further comprises a detachable connecting rod.

Wherein, the stage adjustment structure further comprises a detachable sample stage.

Wherein, the external movable stage system for automated cell microscopic imaging and analysis further comprises a conveyor belt.

Another scope of the present invention is to provide an external movable stage system for automated cell microscopic imaging and analysis. The external movable stage system for automated cell microscopic imaging and analysis comprises a microscope and an external movable stage device. The microscope is configured to observe a cell sample. The external movable stage device is externally connected to the microscope, and configured to assist the microscope in observing the cell sample and prevent vibration of the microscope. The external movable stage device comprising: an automatic stage module, comprising a stage adjustment structure and a movable stage connected to the stage adjustment structure, wherein the stage adjustment structure is detachably positioned on one side of the microscope, and the movable stage is located between an objective lens of the microscope and a sample stage when the stage adjustment structure is positioned on one side of the microscope, and is driven by the stage adjustment structure to move in the X-axis and Y-axis directions; a control module, coupled to the stage adjustment structure to control the stage adjustment structure to drive the movable stage for movement, the control module being configured to control the movable stage to move in a scanning manner so that all parts of a sample plate sequentially pass through the objective lens of the microscope to capture a plurality of sub-images; and an image positioning module, coupled to the control module, the image positioning module being configured to automatically adjust a focal length of a microscope lens of the microscope, and upon detecting a displacement of the sub-images, automatically adjust the sub-images to a correct position, and synthesize the sub-images by an image processing method to generate a full image.

Wherein, the external movable stage system for automated cell microscopic imaging and analysis further comprises an image recognition module coupled to the control module and the microscope, the image recognition module utilizes artificial intelligence to process and analyze the full image, providing precise data on cell growth density and coverage ratio. This reduces subjective errors caused by varying judgments among different operators.

Wherein, the movable stage of the external movable stage device further comprises an XY-axis stage, configured to horizontally move the sample plate between the objective lens and the sample stage of the microscope along an X-axis and a Y-axis under the driving of the stage adjustment structure.

Wherein, the external movable stage device further comprises a storage space configured to accommodate the stage adjustment structure and the movable stage of the automatic stage module.

Wherein, the external movable stage device further comprises a hole and a sealing cover corresponding to the hole, wherein the hole is configured to allow entry and exit of the stage adjustment structure and the movable stage of the automatic stage module, and the sealing cover is configured to prevent contamination of the stage adjustment structure and the movable stage by impurities in an operating environment.

Wherein, the movable stage of the external movable stage device further comprises a detachable connecting rod.

Wherein, the stage adjustment structure of the external movable stage device further comprises a detachable sample stage.

Wherein, the external movable stage device further comprises a conveyor belt.

In summary, the present invention provides an external movable stage system for automated cell microscopic imaging and analysis. The automatic external movable stage device of the present invention can reduce the frequency of manual handling of the cell culture dish, thereby lowering the risk of cell contamination. Additionally, automated stage movement via the external movable stage device can reduce the risk of temperature fluctuations in cells due to body or environmental heat. Moreover, the external movable stage device is an external add-on, compatible with commercially available microscopes, allowing both manual and automated movement of the stage while reducing vibrations during cell culture observation. Furthermore, the image recognition module of the invention can analyze images of the sample plate to yield more precise data on cell growth density and coverage rate, minimizing experimental errors caused by subjective judgment from different operators.

BRIEF DESCRIPTION OF THE APPENDED DRAWINGS

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of this specification, the description with reference to the terms "an embodiment", "another embodiment" or "part of an embodiment" means that a particular feature, structure, material or characteristic described in connection with the embodiment including in at least one embodiment of the present invention. In this specification, the schematic representations of the above terms do not necessarily refer to the same embodiment. Furthermore, the particular features, structures, materials or characteristics described may be combined in any suitable manner in one or more embodiments. Furthermore, the indefinite articles "a" and "an" preceding a device or element of the present invention are not limiting on the quantitative requirement (the number of occurrences) of the device or element. Thus, "a" should be read to include one or at least one, and a device or element in the singular also includes the plural unless the number clearly refers to the singular.

Figure 1:
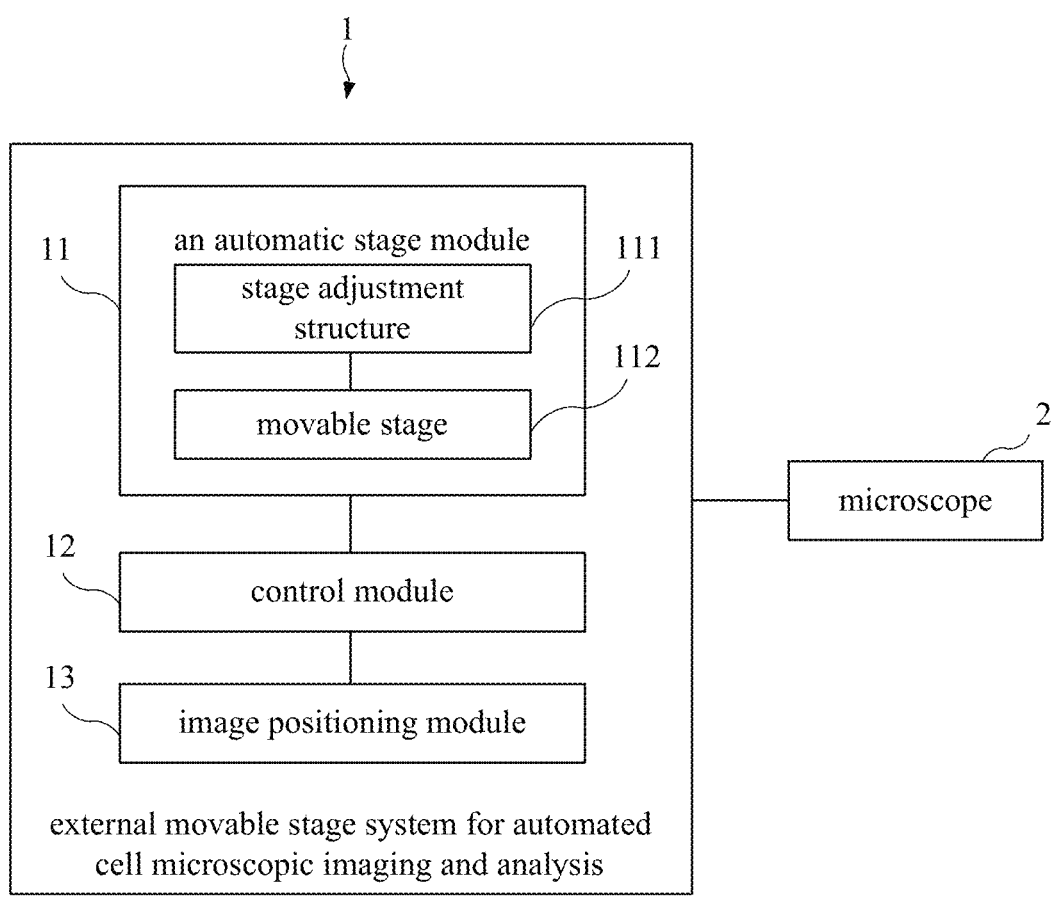
FIG. 1 is a functional block diagram of an external movable stage system for automated cell microscopic imaging and analysis according to an embodiment of the present invention.
Figure 2:
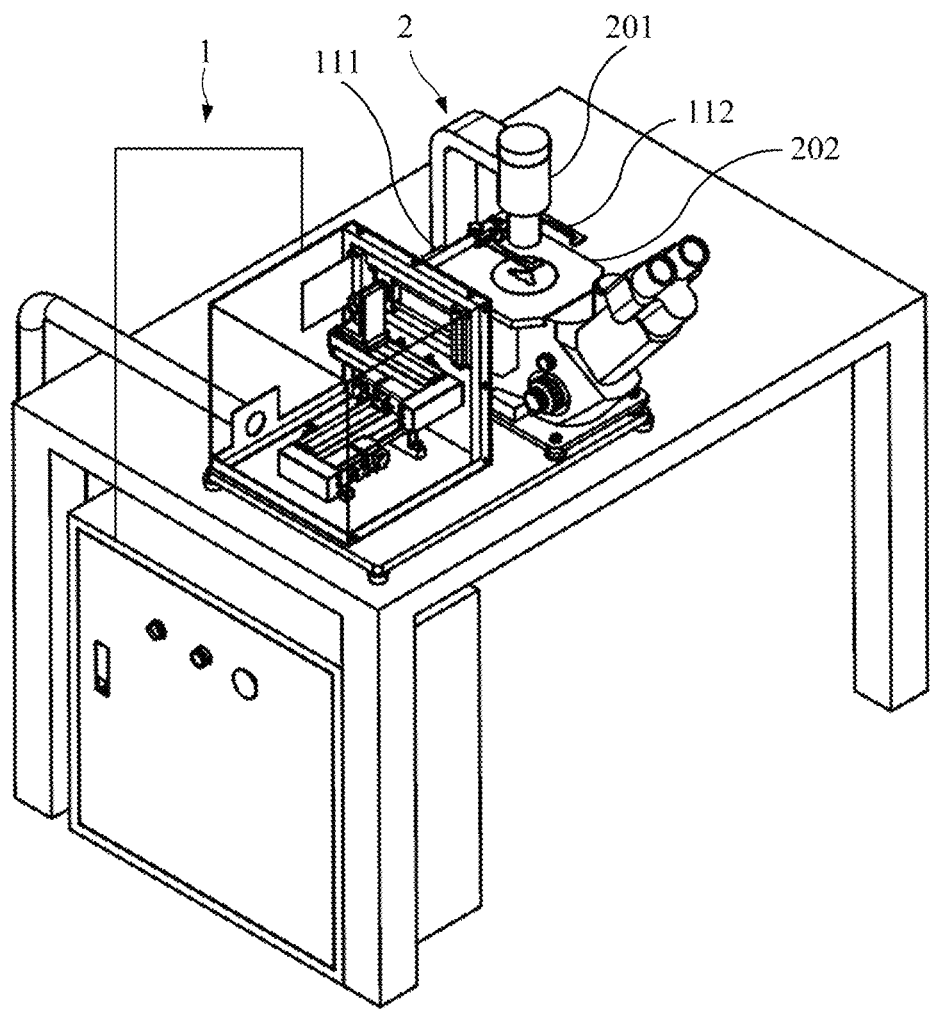
FIG. 2 is a structural schematic diagram of an external movable stage system for automated cell microscopic imaging and analysis according to an embodiment of the present invention.

Please refer to FIG. 1, and FIG. 2. FIG. 1 is a functional block diagram of an external movable stage system 1 for automated cell microscopic imaging and analysis according to an embodiment of the present invention. FIG. 2 is a structural schematic diagram of an external movable stage system 1 for automated cell microscopic imaging and analysis according to an embodiment of the present invention. In this embodiment, the external movable stage system 1 for automated cell microscopic imaging and analysis can assist microscope 2 in observing cell samples and minimizes vibrations affecting microscope 2. As shown in FIG. 1, the external movable stage system 1 for automated cell microscopic imaging and analysis of this embodiment comprises an automatic stage module 11, a control module 12, and an image positioning module 13. The automatic stage module 11 comprises a stage adjustment structure 111 and a movable stage 112 connected to it. The stage adjustment structure 111 is detachably positioned on one side of the microscope 2. The movable stage 112 is located between an objective lens 201 of the microscope 2 and a sample stage 202 when the stage adjustment structure 111 is positioned on one side of the microscope 2, and is driven by the stage adjustment structure 111 to move in the X-axis and Y-axis directions. The control module 12 is coupled to the stage adjustment structure 111 to control the stage adjustment structure 111 to drive the movable stage 112 for movement. The control module 12 is configured to control the movable stage 112 to move in a scanning manner so that all parts of a sample plate sequentially pass through the objective lens 201 of the microscope 2 to capture a plurality of sub-images. The scanning method of the movable stage 112 can be repeated by point scanning, line scanning, area scanning, etc. to obtain multiple sub-images. In practice, the scanning method is not limited the above and can be adjusted and designed according to the needs of the user. The image positioning module 13 is coupled to the control module 12. The image positioning module 13 is configured to automatically adjust a focal length of a microscope lens of the microscope 2, and upon detecting a displacement of the sub-images, automatically adjust the sub-images to a correct position, and synthesize the sub-images by an image processing method to generate a full image. In this embodiment, the external movable stage system 1 for automated cell microscopic imaging and analysis can move along the X and Y axes through the stage adjustment structure 111, while Z-axis adjustments are controlled by the image positioning module 13 by adjusting the lens focus. The external movable stage system 1 for automated cell microscopic imaging and analysis is designed to be detachably positioned on a microscope, does not require modifications to the microscope's main body or control knobs, reducing both vibrations and manufacturing costs. Moreover, by automating the movement of the sample plate, the device minimizes the frequency of manual contact with the culture dish, thereby reducing the risk of cell contamination.

Figure 3:
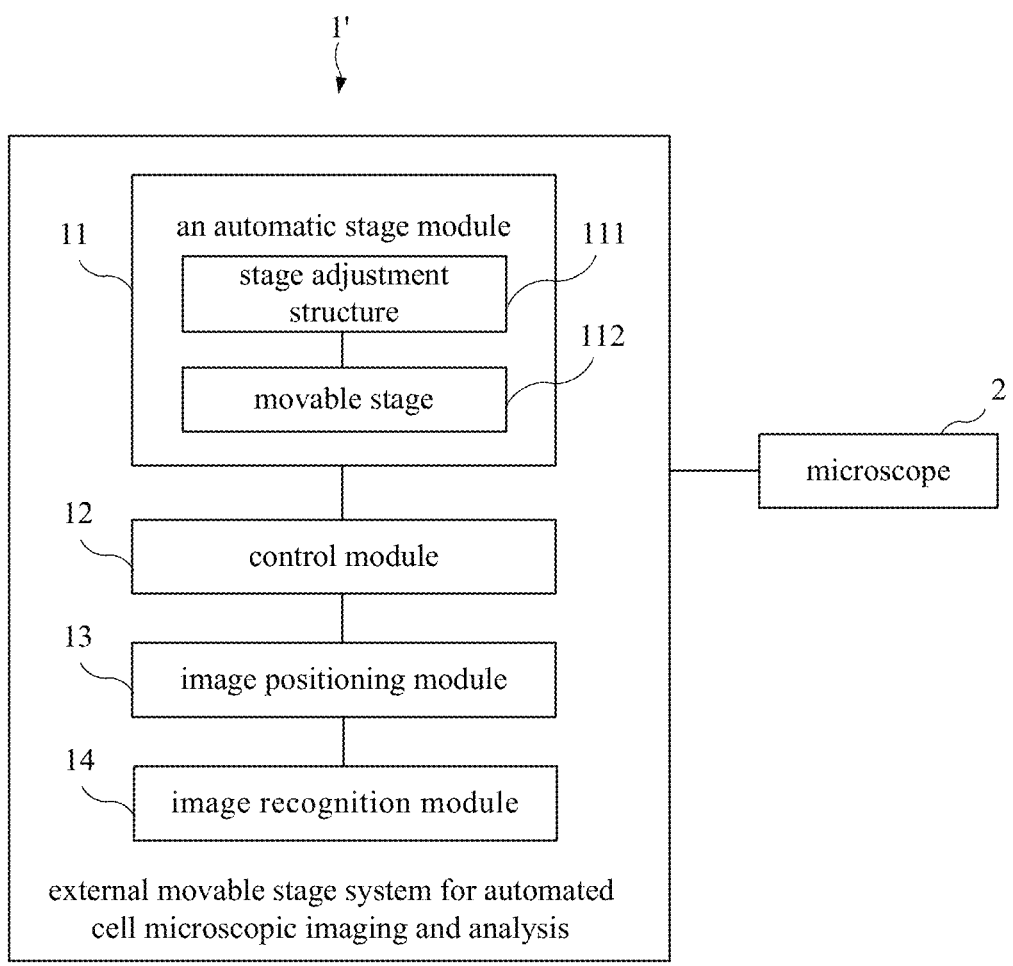
FIG. 3 is a functional block diagram of an external movable stage system for automated cell microscopic imaging and analysis according to another embodiment of the present invention.

Please refer to FIG. 3. FIG. 3 is a functional block diagram of an external movable stage system 1' for automated cell microscopic imaging and analysis according to another embodiment of the present invention. As shown in FIG. 3, this embodiment differs from the previously described embodiment in that the external movable stage system 1' for automated cell microscopic imaging and analysis further comprises an image recognition module 14, coupled to the control module 12 and the microscope 2. The image recognition module 14 is configured to receive and analyze the full image to obtain a growth density and a coverage rate of the cell sample on the sample plate. Additionally, the image recognition module 14 of the present invention can receive and analyze the images of the sample plate through the artificial intelligence engine to obtain more accurate growth density and coverage of the cell samples, thus reducing the experimental errors caused by subjective judgments of different operators. It should be noted that the other modules and their functions within the external movable stage system 1' for automated cell microscopic imaging and analysis in this embodiment are generally similar to the corresponding modules described in the previous embodiments, and therefore, further details are omitted here.

Figure 4:
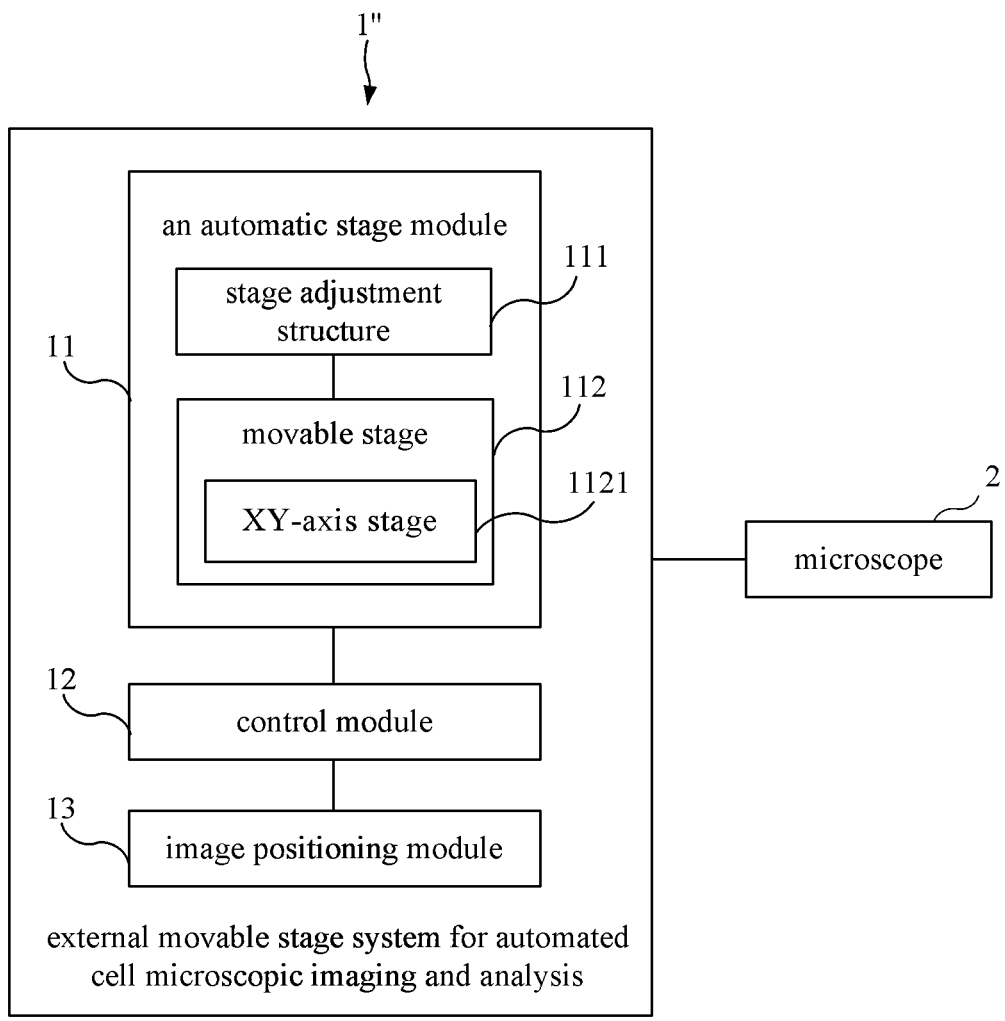
FIG. 4 is a functional block diagram of an external movable stage system for automated cell microscopic imaging and analysis according to another embodiment of the present invention.

Please refer to FIG. 4. FIG. 4 is a functional block diagram of an external movable stage system 1" for automated cell microscopic imaging and analysis according to another embodiment of the present invention. This embodiment differs from the previous examples in that the movable stage 112 within of the external movable stage system 1" for automated cell microscopic imaging and "analysis further comprises an XY-axis stage 1121. The XY-axis stage 1121 configured to horizontally move the sample plate between the objective lens 201 (as shown in FIG. 2) and the sample stage 202 (as shown in FIG. 2) of the microscope 2 along an X-axis and a Y-axis under the driving of the stage adjustment structure 111. Additionally, in another embodiment, the external movable stage system for automated cell microscopic imaging and analysis can further comprises a conveyor belt (not shown). The conveyor belt facilitates horizontal and vertical movement of the sample stage 202 within the microscope 2. It should be noted that the other modules and their functions within the external movable stage system 1" for automated cell microscopic imaging and analysis in this embodiment are generally similar to the corresponding modules described in the previous embodiments, and therefore, further details are omitted here.

Figure 5:
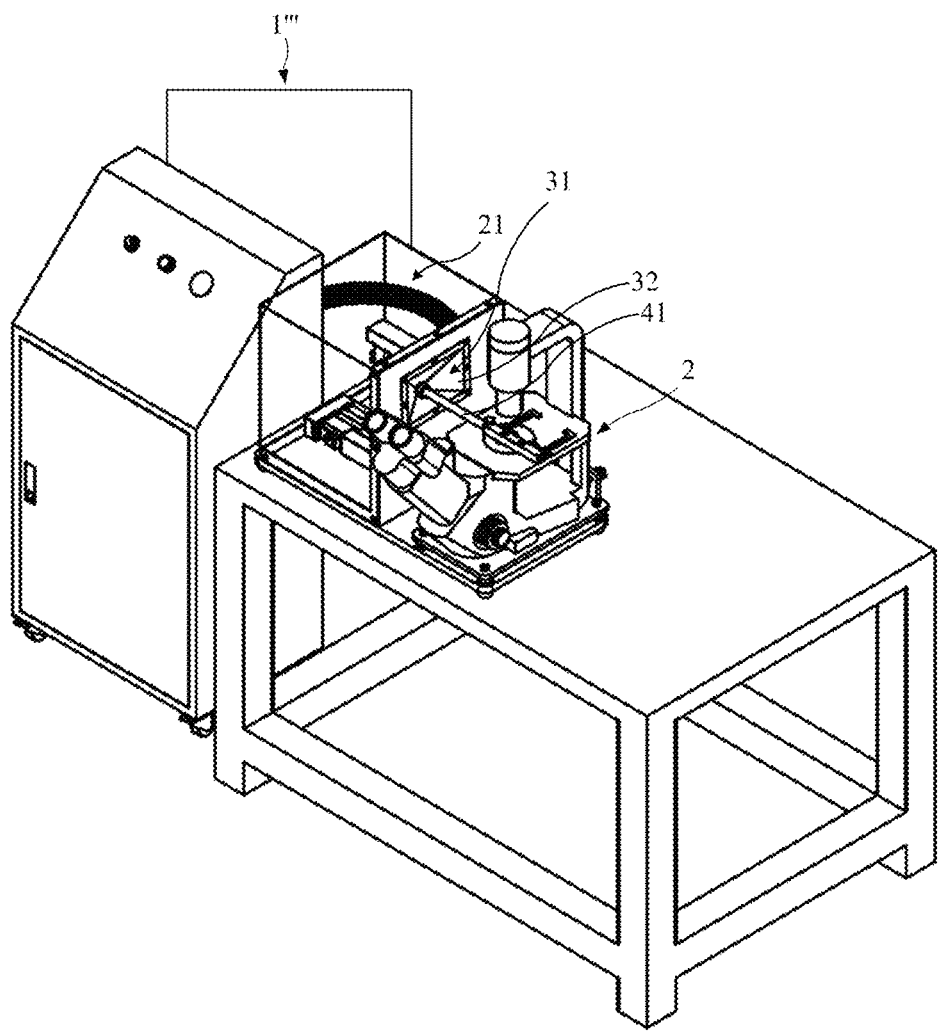
FIG. 5 is a structural schematic diagram of an external movable stage system for automated cell microscopic imaging and analysis according to another embodiment of the present invention.

Please refer to FIG. 1 and FIG. 5. FIG. 5 is a structural schematic diagram of an external movable stage system 1''' for automated cell microscopic imaging and analysis according to another embodiment of the present invention. As shown in FIG. 5, this embodiment of the external movable stage system 1''' for automated cell microscopic imaging and analysis can comprise a storage space 21, configured to accommodate the stage adjustment structure 111 and movable stage 112 of the automatic stage module 11. The external movable stage system 1'' for automated cell microscopic imaging and analysis of this embodiment can comprise a hole 31 and a sealing cover 32 corresponding to the hole 31. The hole 31 is configured to allow entry and exit of the stage adjustment structure 111 and the movable stage 112 of the automatic stage module 11. The sealing cover 32 is configured to prevent contamination of the stage adjustment structure 111 and the movable stage 112 by impurities in an operating environment. When the control module 12 in this embodiment activates the stage adjustment structure 111 to drive the movement of the movable stage 112, the sealing cover 32 opens, allowing the movable stage 112 to extend outward. When control module 12 stops the stage adjustment structure 111 operation, the movable stage 112 retracts through opening 31 back into the storage space 21, at which point the sealing cover 32 closes. The movable stage can include a detachable connecting rod 41 in another embodiment. In another embodiment, the stage adjustment structure in the external movable stage system for automated cell microscopic imaging and analysis can include a detachable sample stage (not shown). Please note that the other modules and functions of the external movable stage system 1''' for automated cell microscopic imaging and analysis in this embodiment are generally the same as those in the previous embodiments, and further details are therefore omitted here.

Figure 6:
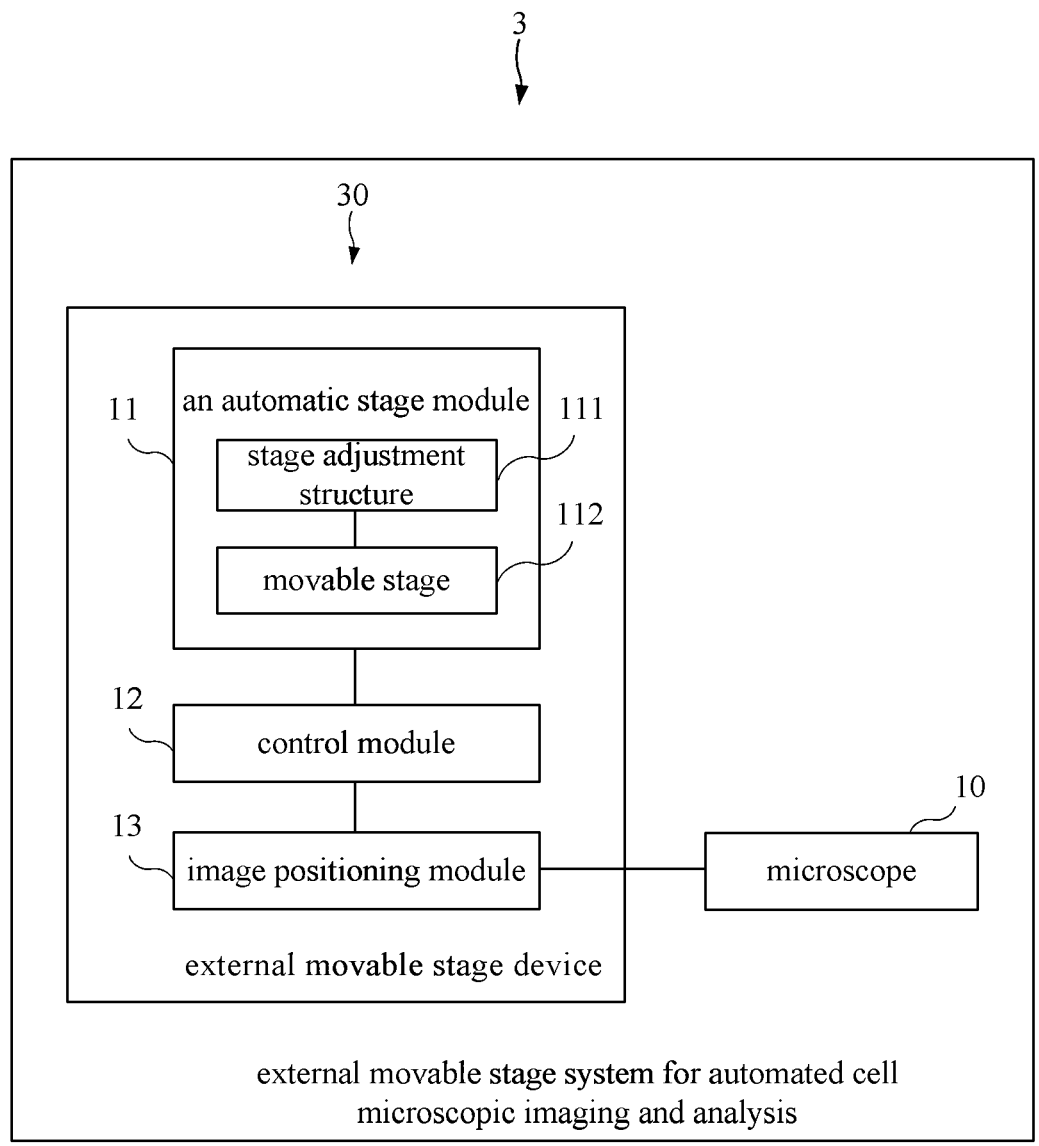
FIG. 6 is a functional block diagram of an external movable stage system for automated cell microscopic imaging and analysis according to another embodiment of the present invention.

Another scope of the present invention is to provide an external movable stage system for automated cell microscopic imaging and analysis. Wherein, an external movable stage device is detachably connected to a microscope. Please refer to FIG. 6. FIG. 6 is a functional block diagram of an external movable stage system 3 for automated cell microscopic imaging and analysis according to another embodiment of the present invention. As shown in FIG. 6, the external movable stage system 3 for automated cell microscopic imaging and analysis comprises a microscope 10 and an external movable stage device 30. The microscope 10 is configured to observe a cell sample. The external movable stage device 30 is externally connected to the microscope 10, and configured to assist the microscope 10 in observing the cell sample and prevent vibration of the microscope 10. The external movable stage device 30 comprises an automatic stage module 11, a control module 12, and an image positioning module 13. The automatic stage module 11 comprises a stage adjustment structure 111 and a movable stage 112 connected to it. The stage adjustment structure 111 is detachably positioned on one side of the microscope 10. The movable stage 112 is located between an objective lens (not shown) of the microscope 10 and a sample stage (not shown) when the stage adjustment structure 111 is positioned on one side of the microscope 10, and is driven by the stage adjustment structure 111 to move in the X-axis and Y-axis directions. The control module 12 is coupled to the stage adjustment structure 111 to control the stage adjustment structure 111 to drive the movable stage 112 for movement. The control module 12 is configured to control the movable stage 112 to move in a scanning manner so that all parts of a sample plate sequentially pass through the objective lens (not shown) of the microscope 10 to capture a plurality of sub-images. The image positioning module 13 is coupled to the control module 12. The image positioning module 13 is configured to automatically adjust a focal length of a microscope lens of the microscope 10, and upon detecting a displacement of the sub-images, automatically adjust the sub-images to a correct position, and synthesize the sub-images by an image processing method to generate a full image. Please note that the other modules and functions of the external movable stage system 3 for automated cell microscopic imaging and analysis in this embodiment are generally the same as those in the previous embodiments, and further details are therefore omitted here.

In summary, the present invention provides an external movable stage system for automated cell microscopic imaging and analysis. The automatic external movable stage device of the present invention can reduce the frequency of manual handling of the cell culture dish, thereby lowering the risk of cell contamination. Additionally, automated stage movement via the external movable stage device can reduce the risk of temperature fluctuations in cells due to body or environmental heat. Moreover, the external movable stage device is an external add-on, compatible with commercially available microscopes, allowing both manual and automated movement of the stage while reducing vibrations during cell culture observation. Furthermore, the image recognition module of the invention can analyze images of the sample plate to yield more precise data on cell growth density and coverage rate, minimizing experimental errors caused by subjective judgment from different operators.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An external movable stage system for automated cell microscopic imaging and analysis, configured to assist a microscope in observing a cell sample and prevent vibration of the microscope, the external movable stage system for automated cell microscopic imaging and analysis comprising:

an automatic stage module, comprising a stage adjustment structure and a movable stage connected to the stage adjustment structure, wherein the stage adjustment structure is detachably positioned on one side of the microscope, and the movable stage is located between an objective lens of the microscope and a sample stage when the stage adjustment structure is positioned on one side of the microscope, and is driven by the stage adjustment structure to move in the X-axis and Y-axis directions;

a control module, coupled to the stage adjustment structure to control the stage adjustment structure to drive the movable stage for movement, the control module being configured to control the movable stage to move in a scanning manner so that all parts of a sample plate sequentially pass through the objective lens of the microscope to capture a plurality of sub-images; and an image positioning module, coupled to the control module, the image positioning module being configured to automatically adjust a focal length of a microscope lens of the microscope, and upon detecting a displacement of the sub-images, automatically adjust the sub-images to a correct position, and synthesize the sub-images by an image processing method to generate a full image.

2. The external movable stage system for automated cell microscopic imaging and analysis of claim 1, further comprising an image recognition module coupled to the control module and the microscope, the image recognition module being configured to receive and analyze the full image to obtain a growth density and a coverage rate of the cell sample on the sample plate.

3. The external movable stage system for automated cell microscopic imaging and analysis of claim 1, wherein the movable stage further comprises an XY-axis stage, configured to horizontally move the sample plate between the objective lens and the sample stage of the microscope along an X-axis and a Y-axis under the driving of the stage adjustment structure.

4. The external movable stage system for automated cell microscopic imaging and analysis of claim 1, further comprising a storage space configured to accommodate the stage adjustment structure and the movable stage of the automatic stage module.

5. The external movable stage system for automated cell microscopic imaging and analysis of claim 1, further comprising a hole and a sealing cover corresponding to the hole, wherein the hole is configured to allow entry and exit of the stage adjustment structure and the movable stage of the automatic stage module, and the sealing cover is configured to prevent contamination of the stage adjustment structure and the movable stage by impurities in an operating environment.

6. The external movable stage system for automated cell microscopic imaging and analysis of claim 1, wherein the movable stage further comprises a detachable connecting rod.

7. The external movable stage system for automated cell microscopic imaging and analysis of claim 1, wherein the stage adjustment structure further comprises a detachable sample stage.

8. The external movable stage system for automated cell microscopic imaging and analysis of claim 1, further comprising a conveyor belt.

9. An external movable stage system for automated cell microscopic imaging and analysis, comprising:
   a microscope, configured to observe a cell sample; and
   an external movable stage device, externally connected to the microscope, configured to assist the microscope in observing the cell sample and prevent vibration of the microscope, the external movable stage device comprising:
      an automatic stage module, comprising a stage adjustment structure and a movable stage connected to the stage adjustment structure, wherein the stage adjustment structure is detachably positioned on one side of the microscope, and the movable stage is located between an objective lens of the microscope and a sample stage when the stage adjustment structure is positioned on one side of the microscope, and is driven by the stage adjustment structure to move in the X-axis and Y-axis directions;
      a control module, coupled to the stage adjustment structure to control the stage adjustment structure to drive the movable stage for movement, the control module being configured to control the movable stage to move in a scanning manner so that all parts of a sample plate sequentially pass through the objective lens of the microscope to capture a plurality of sub-images; and
      an image positioning module, coupled to the control module, the image positioning module being configured to automatically adjust a focal length of a microscope lens of the microscope, and upon detecting a displacement of the sub-images, automatically adjust the sub-images to a correct position, and synthesize the sub-images by an image processing method to generate a full image.

10. The external movable stage system for automated cell microscopic imaging and analysis of claim 9, further comprising an image recognition module coupled to the control module and the microscope, the image recognition module being configured to receive and analyze the full image to obtain a growth density and a coverage rate of the cell sample on the sample plate.

11. The external movable stage system for automated cell microscopic imaging and analysis of claim 9, wherein the movable stage of the external movable stage device further comprises an XY-axis stage, configured to horizontally move the sample plate between the objective lens and the sample stage of the microscope along an X-axis and a Y-axis under the driving of the stage adjustment structure.

12. The external movable stage system for automated cell microscopic imaging and analysis of claim 9, wherein the external movable stage device further comprises a storage space configured to accommodate the stage adjustment structure and the movable stage of the automatic stage module.

13. The external movable stage system for automated cell microscopic imaging and analysis of claim 9, wherein the external movable stage device further comprises a hole and a sealing cover corresponding to the hole, wherein the hole is configured to allow entry and exit of the stage adjustment structure and the movable stage of the automatic stage module, and the sealing cover is configured to prevent contamination of the stage adjustment structure and the movable stage by impurities in an operating environment.

14. The external movable stage system for automated cell microscopic imaging and analysis of claim 9, wherein the movable stage of the external movable stage device further comprises a detachable connecting rod.

15. The external movable stage system for automated cell microscopic imaging and analysis of claim 9, wherein the stage adjustment structure of the external movable stage device further comprises a detachable sample stage.

16. The external movable stage system for automated cell microscopic imaging and analysis of claim 9, wherein the external movable stage device further comprises a conveyor belt.

* * * * *